March 21, 1961   J. J. EVERARD   2,975,612
CONTROL MEANS FOR DEFROSTING REFRIGERATORS
Filed Oct. 1, 1956   2 Sheets-Sheet 1

INVENTOR.
JOSEPH J. EVERARD
BY
*Arthur R. Woolfolk*
ATTORNEY

March 21, 1961  J. J. EVERARD  2,975,612
CONTROL MEANS FOR DEFROSTING REFRIGERATORS
Filed Oct. 1, 1956  2 Sheets-Sheet 2
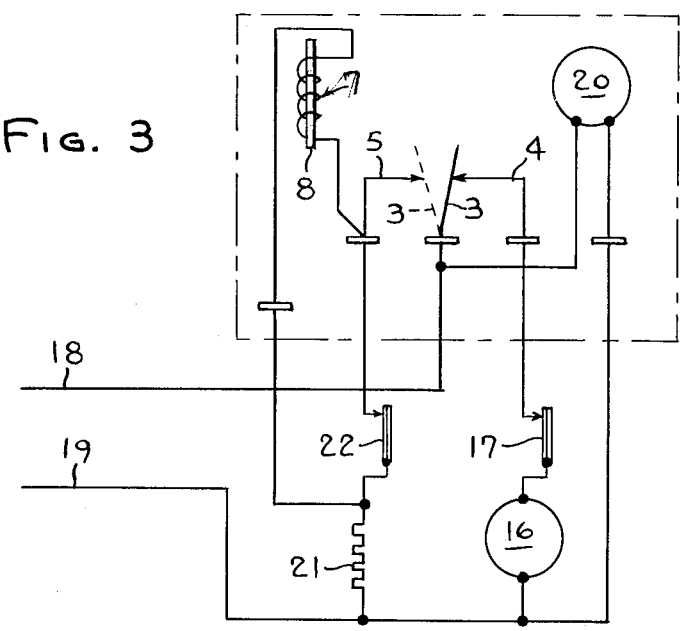
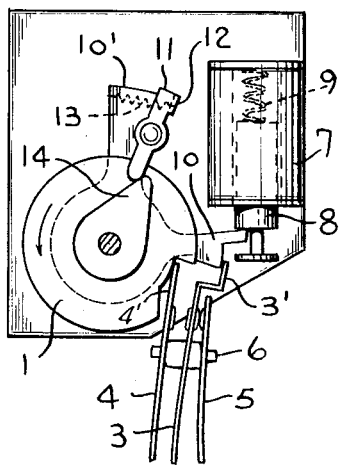
FIG. 4
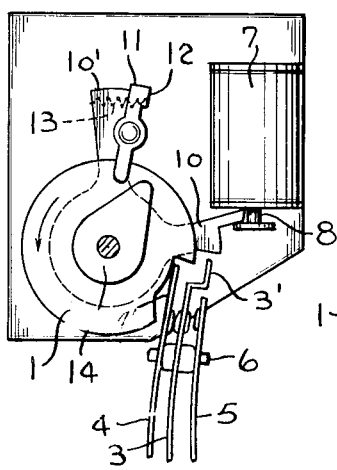
FIG. 5
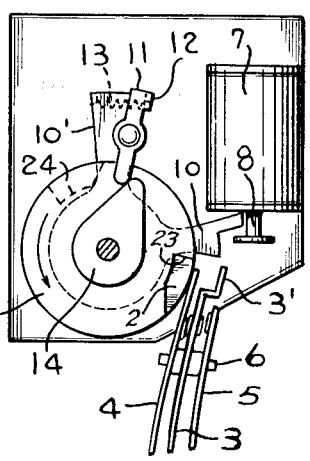
FIG. 6
INVENTOR.
JOSEPH J. EVERARD
BY
Carter R. Woolfolk
ATTORNEY

United States Patent Office 2,975,612
Patented Mar. 21, 1961

2,975,612

CONTROL MEANS FOR DEFROSTING REFRIGERATORS

Joseph J. Everard, Two Rivers, Wis., assignor to Paragon Electric Company, Two Rivers, Wis.

Filed Oct. 1, 1956, Ser. No. 613,186

2 Claims. (Cl. 62—155)

This invention relates to control means for defrosting refrigerators.

This invention is an improvement over that disclosed in the patent of David Morrison Number 2,690,526, of September 28, 1954, for Control Means for Defrosting Refrigerators, and assigned to the same assignee as the present invention.

In the prior invention disclosed in the above noted patent, control means were employed in which a timer cam rotated once every 24 hours, for initiating the defrosting operation, and in which means were provided for terminating the defrosting operation. It is found however that the principle of this construction, as set forth in the above disclosed patent was not entirely satisfactory since if the construction were modified to provide a defrosting period once every five days, instead of once every day, the compressor could not be put back into operation until after a lapse of time five times the period for defrosting. For example, if the patented construction referred to above, took a fifteen minute defrosting period, seventy-five minutes would be required before the compressor was put back into operation. This would allow too much heating up of the refrigerator which would be wholly unsatisfactory.

Objects of this invention are to provide a novel form of control means for defrosting refrigerators in which the defrosting operation is time initiated and temperature terminated, in which a heater is provided for quickly raising the temperature and stopping the operation of the compressor so as to provide quick defrosting, and in which means are provided for instantaneously cutting out the heater and starting the compressor when the desired temperature has been obtained.

Further objects are to provide a solenoid controlled device for transferring the electrical energy supplied, from the heater to the compressor so that the solenoid only operates instantaneously and the solenoid, therefore, is not called upon to continuously operate for several minutes at a time, thus avoiding the noise of the solenoid, and in which the solenoid is arranged to cut itself off after its instantaneous operation.

Further objects are to provide a construction in which the device can be so made that it will cause defrosting after 1 day, 2 days, 3 days, 4 days, 5 days, and so forth, as desired, by means of a simple change made at the factory.

Further objects are to provide a construction in which the change from a 1 day defrosting operation to a defrosting operation of many days is easy to make at the factory without any elaborate change in the apparatus, but by means of a very simple change in gearing and cam construction which is all that is required.

Further objects are to provide a safety feature which may be called "a fail safe device," which is so constructed that in the event the thermostat controlling the heater and solenoid should fail to operate, nevertheless upon continued motion of the controlling cams, this defective operation would be corrected by disconnecting the heater and reestablishing the correct and normal mode of operation.

Further objects are to provide a control means for defrosting refrigerators which is very simple to make, which is relatively cheap to manufacture, and which is reliable in operation.

An embodiment of the invention is shown in the accompanying drawings in which:

Figure 3 is a wiring diagram.

Figures 4, 5 and 6 are successive views respectively showing the relative position of the parts when the heater is in operation and the compressor is cut off, when the compressor is on and the heater is cut off, and when the parts have been restored to their initial position by the operation of the safety feature.

Figure 1:
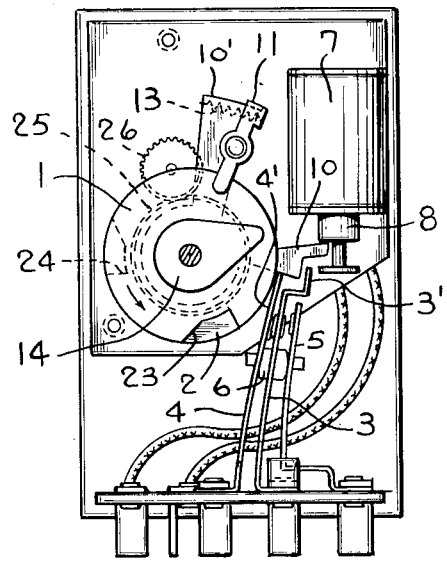
Figure 1 is a view of the apparatus with the cover removed and with the parts in their normal position.

Referring to the drawings it will be seen that two cams are provided. One of the cams is indicated by the reference character 1 and is a 24 hour cam or in other words, a one day cam. The other cam is indicated by the reference character 2 and may be a one day, two day, three day, four day, five day, or any number of days cam. It will be referred to as the second cam or as the cam which rotates once every predetermined number of days which is intended to cover either a one day rotation, which is seldom used, or a two, or three, or four, or five day, or any number of days rotation. This will be explained in detail hereinafter. The cams 1 and 2 may also be referred to as the one day cam and the plural day or multiple day cam, respectively.

Figure 2:
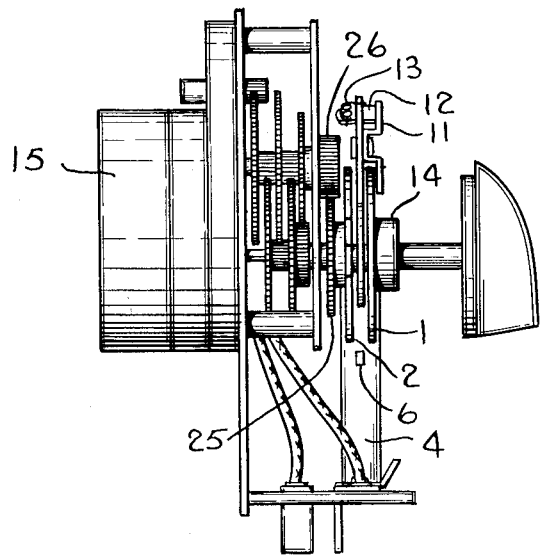
Figure 2 is a side elevation of the apparatus.

These cams are driven from a synchronous motor 15, see Figure 2, through gearing. The contact arms are indicated by the reference characters 3, 4, and 5 and are, respectively, the power supplying arm or power arm or finger 3, the compressor arm or finger 4, and the heater arm or finger 5.

The three arms are biased towards the left as viewed in Figure 4. For example, the arm 5 may be most heavily biased and it is to be noted that this arm 5 is spaced, by means of an insulating spacer 6, from the arm 4 and that shoulders are provided on the insulating spacer 6 so that the biased arm 5 transmits its motion to the arm 4 and thus biases the arm 4 to the left when in the position shown in Figure 4. The arm 4 is inherently biased towards the right with reference to the arm 5, whereas arm 5 is more heavily biased to the left as viewed in Figure 4, than the arm 4, so that the extension or upper end 4' of the arm 4 rides on the two cams when it is pressed to the right by the cams as viewed in Figure 1. The heater arm 5 will be forced to the right and will be out of contact with the power supplying central arm 3. On the other hand, as soon as the arm 4 drops into the two notches of the two cams, 1 and 2, the arms assume the position shown in Figure 4 in which the arm 4 has moved out of contact with the power supplying arm 3 and in which the heater arm 5 is in electrical contact with the power supplying arm 3.

This condition of the arms, or relative position of the arms, continues until a solenoid indicated by the reference character 7, see Figure 5, has been energized and has raised its plunger 8 against the action of the spring 9, see Figure 4, and thereby tripped the locking pawl 10. It is to be noted from reference to Figure 4 that the power arm 3 is caught behind the shoulder of the locking pawl or latching pawl 10 and may be released therefrom by energization of the solenoid 7 which will be described later.

It is to be noted that the locking pawl 10 has an extension 10' which is connected to a spring-held releasing arm, or emergency releasing arm, 11, pivoted thereon and provided with a lip 12 which normally engages the right hand side of the extension arm 10' of the locking pawl 10. The emergency arm or finger 11 is spring urged in a counter clock wise direction by means of the spring 13 so that when the 24 hour cam rotates a predetermined distance a projecting portion or finger or tripping member 14, see Figure 4, will engage the emergency releasing, spring-held finger 11 of the tripping or latching pawl 10 and will move the latching pawl 10 in a counter clock wise direction thereby releasing the power supplying finger or contact member 3. The reason for the above described action is that the finger 11 and the extension 10' are, in effect, one rigid unit temporarily, and force to the left applied to the finger 11 will move the then rigid unit, consisting of the finger 11 and the extension 10', to the left. The spring 13 yields only on continued motion of the tripping member 14 to the left and then the finger 11 snaps back to its normal position as shown. This allows the heater to be immediately disconnected from the power supplying arm 3 and reconnects the arm 4 of the compressor unit 16 with the power supplying arm 3. Figure 5 shows this state of affairs when the latching pawl 10 has been released by energization of the solenoid 7. However, this same release may be obtained under an emergency condition, for example, when the solenoid for some reason or other does not operate. Under these conditions the latching pawl arm or extension 10', with its spring pressed pawl 11 and the projecting member 14 constitutes what may be called "a fail safe device" so that the pawl 10 is released even though the solenoid 7 is not energized through some fault developed in the defrosting control means. It is to be understood that the spring 13 will necessarily have to be a stronger or heavier spring than the spring 9 which urges the plunger 8 of the solenoid 7 downwardly so as to overcome the downward bias of the plunger 8 and release the latching pawl 10. The normal operation, however, is obtained by energization of the solenoid 7 which raises its plunger 8 and thus releases the latching pawl 10.

The electrical circuit, for the defrost control means, is shown in Figure 3 diagrammatically and attention is now called to such figure. In this figure the power supplying arm 3 is biased to the right due to the fact that the arm 4 is riding on the cams, and the heater contact arm and compressor contact arm are indicated, respectively, by the reference characters 5 and 4. The position of the parts under normal condition is shown in the full lines. The defrosting position wherein the heater is energized is shown in the dotted lines. The compressor element or assembly 16 is connected to the arm 4 through a thermostat 17 which closes when the temperature rises above a predetermined point and thereby connects the compressor motor with the source of power. The power lines are indicated by the reference characters 18 and 19.

The timer element, having the synchronous motor 15, is indicated by the reference character 20 in Figure 3 and the heater by the reference character 21. The heater is connected through the thermostat 22 which opens its contacts upon rise of temperature beyond a predetermined point. It is to be noted, as stated hereinabove, that the thermostat 22 opens its contacts upon rise of temperature beyond a predetermined point and that the thermostat 17 opens its contacts upon a fall of temperature below a predetermined point. The thermostat 17 controls the compressor assembly in the ordinary manner.

The operation of the apparatus is as follows:

It is to be noted that the two cams 1 and 2 are each provided with notches having an abrupt front edge or leading edge and a slanting rear edge. The notch for the cam 1, or one day cam, is indicated by the reference character 23 and the notch in the multiple day cam 2 is indicated by the reference character 24. Normally these notches are not in synchronism or in other words are not in alignment and do not coincide. However, when they do coincide, or arrive at exactly the same position, as shown in Figure 4, the compressor arm 4 drops into the notches as shown in Figure 4 while the extension 3' of the power arm 3 is caught by the restraining pawl or latching pawl 10. The heater arm or contact arm 5 is now in contact with the power supplying arm or power arm 3 and consequently the heater 21 is put into operation since its thermostat 22 is closed. The thermostat 22 remains closed and the heater heats the air in the refrigerator in the usual way and causes rapid defrosting. When the desired temperature has been reached within the refrigerator the thermostat 22 opens and the solenoid 7 is instantly energized and releases the power contact finger 3, as shown in Figure 5, so that the power contact finger 3 immediately snaps over or moves over into contact with the compressor contact finger 4 and starts the compressor. The solenoid is now instantly deenergized, since its circuit is opened by motion of the power finger 3 from the dotted line position to the full line position of Figure 3. It will be seen therefore that the solenoid 7 is only instantaneously energized and does not remain energized for any appreciable length of time. The reason the solenoid 7 is not immediately energized when the power arm 3 engages the heater arm 5 is that the two terminals of the solenoid 7 are connected or bridged by the closed thermostat 22. However, as soon as the thermostat 22 opens, the solenoid 7 is energized as it is now in series with the heater and the power contact finger 3. This state of affairs remains only for a brief instant, as stated above, as the solenoid 7 immediately trips the restraining pawl 10 and allows the parts to assume the position shown in full lines in Figure 3, and as shown in Figure 5.

Thus it will be seen that the defrost control apparatus is such that it is time controlled or time initiated and temperature controlled or temperature terminated. It is to be noted also that the solenoid, which is a noisy piece of apparatus, is on only instantaneously and immediately trips the restraining pawl 10 and allows the contact arms 3, 4 and 5 to assume their normal position as shown in Figure 5.

It is to be noted that the thermostats 17 and 22 are, respectively, the low temperature thermostat and the high temperature thermostat. Further, the low temperature thermostat 17 opens when the temperature falls to a predetermined point, and the high temperature thermostat 22 opens when the temperature rises to a predetermined point.

When the notches 23 and 24 are not in alignment the extension 4' of the compressor contact 4 merely rides on the continuous portion of the circular surfaces of the cams 1 and 2. This state of affairs is shown in Figures 1 and 6 and is the normal position of the contact fingers. However, as stated hereinabove, when the notches 23 and 24 are in alignment as shown in Figure 4, the heater circuit is closed and the tripping solenoid circuit is bridged and the compressor circuit is open.

Attention is now directed to a few of the mechanical portions of the defrost controlling apparatus as shown in Figures 1 and 2. It is to be understood that the cam 2 and its driving gear 25 are made of insulating material and are integral. Its driving gear 25 is driven from the pinion 26 and the arrangement is such that the cam 2 rotates once for a predetermined selected number of days, for example, 1, 2, 3, 4 or 5 days. For convenience of description it will be referred to as a 5 day cam or plural or multiple day cam. This period of rotation of the cam 2 with reference to the 1 day cam 1 may be varied as desired by changing the pinion 26 and by substituting another combination of cam 2 and gear 25 as a unitary assembly. This alteration, of course, is made in the factory but it is to be understood that it allows the period of rotation of the cam 2 to be related in any suitable manner or any desired manner to the period of rotation of the one day cam 1 as hereinabove explained.

It will be seen that a novel control means for defrosting refrigerators has been disclosed in which the defrosting period is time initiated and temperature terminated. It will be seen further that the heating is on only long enough to raise the interior air of the refrigerator to the predetermined desired point and thereafter the heater is taken out of circuit by the instantaneous energization of the tripping or releasing solenoid 7. The instantaneous energization of the solenoid 7 occurs when the thermostat 22, which had bridged the solenoid, opens, and just before the arm 3 is released by the operation of the solenoid.

Further, it is to be noted, that no matter whether or not the solenoid 7 is relied upon, that there is the feature of safety added by the tripping of the restraining pawl 10 by the mechanically driven tripping arm 14 rigid with the one day cam and formed as a unitary portion of the one day cam 1. The restraining pawl 10 is preferably made of insulating material. As explained hereinabove, this "fail safe feature" is obtained by the tripping mechanically of the restraining pawl 10 by the tripping arm 14 after a predetermined length of time in the event of failure of the solenoid 7. However, normal tripping occurs through the energization of the solenoid 7 as hereinabove described.

Although this invention has been described in considerable detail, it is to be understood that such description is intended as illustrative rather than limiting as the invention may be variously embodied and is to be interpreted as claimed.

I claim:

1. In an electric refrigerator, a compressor element, a defrosting heater, a low temperature thermostat in series with said compressor element and arranged to open on decrease of temperature below a predetermined point, a high temperature thermostat in series with said heater and arranged to open on rise of temperature above a predetermined point, a switch including a first contact means operatively connected to said compressor element, a second contact means operatively connected to said heater, a third contact means constituting a power supply means and biased towards contact with said first contact means, cam means coacting with the contact means for causing contact between said third contact means and said second contact means, a latching member for holding said third contact means in engagement with said second contact means, and an electromagnet for tripping said latching member when energized, said electromagnet being bridged by said high temperature thermostat when said high temperature thermostat is closed.

2. In an electric refrigerator, a compressor element, a defrosting heater, a low temperature thermostat in series with said compressor element and arranged to open on decrease of temperature below a predetermined point, a high temperature thermostat in series with said heater and arranged to open on rise of temperature above a predetermined point, a switch including a first contact means operatively connected to said compressor element, a second contact operatively means connected to said heater, a third contact means constituting a power supply means and biased towards contact with said first contact means, cam means coacting with the contact means for causing contact between said third contact means and said second contact means, a latching member for holding said third contact means in engagement with said second contact means, an electromagnet for tripping said latching member when energized, said electromagnet being bridged by said high temperature thermostat when said high temperature thermostat is closed, and a source of electric energy for selectively energizing said compressor element and said heater and electromagnet through said third contact means, said electromagnet being energized only instantaneously while tripping said latching member and when said high temperature thermostat opens.

References Cited in the file of this patent

UNITED STATES PATENTS

| | | |
|---|---|---|
| 2,509,099 | Jones | May 23, 1950 |
| 2,617,900 | Morrison | Nov. 11, 1952 |
| 2,669,848 | Fujii | Feb. 23, 1954 |
| 2,674,665 | Raney et al. | Apr. 6, 1954 |
| 2,711,456 | Goodhouse et al. | June 21, 1955 |
| 2,770,952 | Judd | Nov. 20, 1956 |